United States Patent
Banerjee et al.

(10) Patent No.: US 11,030,016 B2
(45) Date of Patent: Jun. 8, 2021

(54) COMPUTER SERVER APPLICATION EXECUTION SCHEDULING LATENCY REDUCTION

(71) Applicant: INTERNATIONAL BUSINESS MACHINES CORPORATION, Armonk, NY (US)

(72) Inventors: Pradipta K. Banerjee, Karnataka (IN); Sudipta Biswas, Bangalore (IN); Vijay K. Sukthankar, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 167 days.

(21) Appl. No.: 15/834,306

(22) Filed: Dec. 7, 2017

(65) Prior Publication Data

US 2019/0179678 A1   Jun. 13, 2019

(51) Int. Cl.
*G06F 9/50* (2006.01)
*G06F 9/48* (2006.01)
(Continued)

(52) U.S. Cl.
CPC .......... *G06F 9/5083* (2013.01); *G06F 9/4881* (2013.01); *G06F 16/2379* (2019.01); *H04L 47/70* (2013.01); *H04L 67/10* (2013.01)

(58) Field of Classification Search
None
See application file for complete search history.

(56) References Cited

U.S. PATENT DOCUMENTS

2012/0203888 A1*  8/2012  Balakrishnan .......... G06F 9/505
                                              709/224
2013/0247049 A1*  9/2013  Aoki ........................ G06F 9/44
                                              718/100
(Continued)

FOREIGN PATENT DOCUMENTS

CN    106027643 A    10/2016
WO    2016077367 A1   5/2016

OTHER PUBLICATIONS

Firshman, Ben "Serverless Docker" located at: https://github.com/bfirsh/serverless-docker; retrieved: Sep. 19, 2019; 2 pgs.
(Continued)

*Primary Examiner* — Wynuel S Aquino
(74) *Attorney, Agent, or Firm* — Cantor Colburn LLP; Tihon Poltavets

(57) ABSTRACT

Technical solutions are described for assigning containers for executing functions in a software application using a server cluster that uses functions as a service architecture. An example method includes creating, by a global scheduler of the server cluster, a first container at a first host node in the server cluster for executing a first function from the software application. The method further includes intercepting, by an in-node scheduler of the first host node, a command from the first function for creating a second container for executing a second function. The method further includes assigning, by the in-node scheduler, an in-node container as the second container, the in-node container being a container executing on the first host node. The method further includes updating, by the in-node scheduler, a resource database that indicates that the second function is being executed in the in-node container on the first host node.

14 Claims, 6 Drawing Sheets

(51) Int. Cl.
*G06F 16/23* (2019.01)
*H04L 12/911* (2013.01)
*H04L 29/08* (2006.01)

(56) References Cited

U.S. PATENT DOCUMENTS

| | | |
|---|---|---|
| 2016/0162320 A1 | 6/2016 | Singh et al. |
| 2016/0182315 A1 | 6/2016 | Salokanto et al. |
| 2017/0244787 A1* | 8/2017 | Rangasamy ........ H04L 41/0654 |
| 2017/0286153 A1* | 10/2017 | Bak ......................... G06F 9/485 |
| 2017/0322960 A1* | 11/2017 | Glebe ................. G06F 16/2228 |
| 2018/0203742 A1* | 7/2018 | Antony ................. G06F 9/5077 |
| 2018/0349199 A1* | 12/2018 | Vyas ..................... G06F 9/5061 |

OTHER PUBLICATIONS

Firshman, Ben, "Building serverless apps with Docker" retrieved: https://blog.docker.com/2016/06/building-serverless-apps-with-docker/; dated Jun. 21, 2016; 7 pgs.
Wikipedia "Serverless computing" located at: https://en.wikipedia.org/wiki/Serverless_computing; retrieved on Sep. 19, 2019; 6 pgs.

* cited by examiner

COMPUTER SERVER APPLICATION EXECUTION SCHEDULING LATENCY REDUCTION

BACKGROUND

The present invention generally relates to computing technology, and particularly to improving container scheduling latency in a computer server.

Infrastructure as a service (IaaS) is a way of doing business over a communication network. Providers of IaaS offer typically computers, such as physical machines, virtual machines, and/or other resources. For example, a hypervisor of the IaaS provider may run the virtual machines as guests. Pools of hypervisors within the cloud operational support-system can support large numbers of virtual machines and the ability to scale services up and down according to a customer's requirements, which will generally vary over time. Some IaaS providers offer additional resources such as the following: a virtual-machine disk image library, raw (block) and file-based storage, firewalls, load balancers, IP addresses, virtual local area networks (VLANs), and/or software bundles. Some IaaS providers provide these resources on-demand from their large pools of hardware resources. Customers can use either the Internet or carrier clouds (dedicated virtual private networks) for wide area coverage. IaaS providers typically bill IaaS services on a utility computing basis so that cost reflects the number of resources allocated and consumed.

The customers, such as organizations and programmers, instead of maintaining computing resources such as computer servers for executing their computer programs, use such remote computing services maintained by the service providers. Such remote computing services are often configurable and scalable to meet various computing needs of the users of the computing resource.

SUMMARY

According to one or more embodiments, an example method for executing functions in a software application using a server cluster that uses functions as a service architecture is described. The example method includes creating, by a global scheduler of the server cluster, a first container at a first host node in the server cluster for executing a first function from the software application. The method further includes intercepting, by an in-node scheduler of the first host node, a command from the first function for creating a second container for executing a second function. The method further includes assigning, by the in-node scheduler, an in-node container as the second container, the in-node container being a container executing on the first host node. The method further includes updating, by the in-node scheduler, a resource database that indicates that the second function is being executed in the in-node container on the first host node.

According to one or more embodiments, a system includes a server cluster that includes a plurality of host nodes. The system further includes a global scheduler of the server cluster. The global scheduler assigns containers for executing functions in a software application using the server cluster using functions as a service architecture, wherein the global scheduler creates a first container at a first host node in the server cluster, the first container assigned for executing a first function from the software application. The system further includes an in-node scheduler of the first host node. The in-node scheduler intercepts a command from the first function for creating a second container for executing a second function. The in-node scheduler assigns an in-node container as the second container, the in-node container being a container executing on the first host node. The in-node scheduler updates a resource database that indicates that the second function is being executed in the in-node container on the first host node.

According to one or more embodiments, a computer program product includes a computer readable storage medium having program instructions embodied therewith, the program instructions executable by one or more processing circuits to cause the one or more processing circuits to assign containers for executing functions in a software application using a server cluster using functions as a service architecture. The assigning of the containers includes creating, by a global scheduler of the server cluster, a first container at a first host node in the server cluster, the first container assigned for executing a first function from the software application. Further, the assigning of the containers includes intercepting, by an in-node scheduler of the first host node, a command from the first function for creating a second container for executing a second function. Further, the assigning of the containers includes assigning, by the in-node scheduler, an in-node container as the second container, the in-node container being a container executing on the first host node. Further, the assigning of the containers includes updating, by the in-node scheduler, a resource database that indicates that the second function is being executed in the in-node container on the first host node.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

Figure 1:
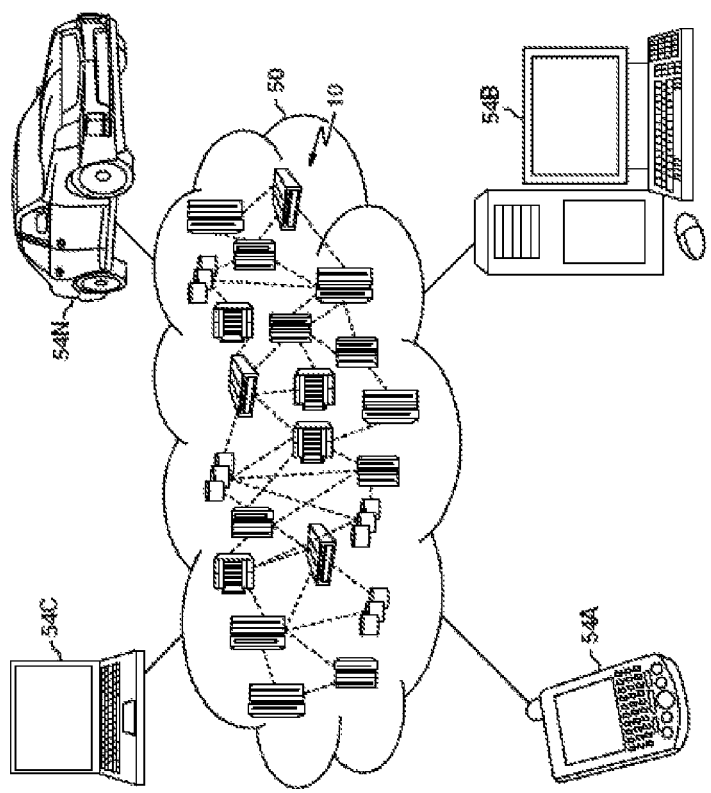
FIG. 1 depicts a cloud computing environment according to an embodiment of the present invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

As used herein, the terms "virtual server", "server", "node" and "host" refer to a physical or virtual computational entity capable of enhancing information and to perform computational tasks. The term server or host may refer to one entity or a group of entities configured to operate jointly. As used herein, term "programming environment" refers to any kind of environment that a programmer uses for creating code and/or building executable program packages.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Typically, in a cloud computing environment, where computing resources from the service providers are being used by the customers over communication networks, the computing resources include Virtual servers (a.k.a. virtual machines) that facilitate computer virtualization of one or more computer server clusters of the provider. Logically, a virtual server appears like a separate computer, having its own IP address. The virtual server includes the application and the necessary binary application software and libraries to run the application hosted and executed by guest operating system of the virtual server. Such virtual servers are resource intensive and also take substantial time for setting up. Further, because the virtual servers invoke separate instances of the operating system and the one or more software, separate licenses are required, which increases the cost of setting up and maintaining the virtual servers.

Such technical challenges were addressed by using containers which facilitate virtualization of computers or, more specifically, computer software applications. A container on a host server (virtual server/non-virtual server) separates the application from the operating system and the physical infrastructure it uses to connect to the computing network. The container is instantiated within the kernel of the operating system, and it virtualizes the instance of an application. The container does not include the operating system like a virtual machine does. Use of containers enables running multiple applications using same host computer resources, without the applications interfering each other. Typically, the container does not have an externally available IP address of its own, although it has a unique ID that may be used by the host. Therefore, a client may not access the container directly. Rather, the server/host manages the container, and the container manages the application code.

An example of such container is Linux Containers LXC. LXC leverages container groups (cgroups) to isolate the CPU, memory, file/block IO and network resources. Namespaces are used to isolate the application from the operating system, so that network access, process trees, user IDs and file access are separated. It should be noted that the technical solutions described herein can be used with implementations of containers other than the above examples.

The containers further facilitate portability of the application being executed by the container. For example, a container has the required dependencies pre-installed, and putting the application code inside of the container runs the application on any server where the container runtime is installed.

Further yet, cloud computing service providers facilitate a serverless setup such that the software application being executed on the server is implemented as functions and events, commonly referred to as Function as a Service (FaaS). Typically, the software application is split into different functionalities (or services), which are in turn triggered by events. The customers (programmers) upload the function code and attach an event source to the code, and the server, in response to the occurrence of the attached events, execute the corresponding function code. Such serverless application architecture provides advantages such as event-driven workflow ("If X then Y"), pay-per-execution, zero administration, auto-scaling, short-lived, stateless functions, among others. Thus, serverless computing is a cloud computing execution model in which the cloud provider dynamically manages the allocation of machine resources. An advantage of serverless computing is that pricing for customers is based on the actual amount of resources consumed by an application, rather than on pre-purchased units of capacity.

It should be noted that "serverless" computing still requires servers and that the name "serverless computing" is used because the server management and capacity planning decisions are hidden from the developer or operator.

A technical challenge exists in using containers in a serverless architecture. A typical set of operations that are used for execution of an application in a containerized serverless architecture include 1. An invocation of action in response to event trigger result in the creation or assignment of a new container. For example, if DOCKER™ is used as a container management system, the creation of a new container may include calling of 'docker -H <apiserver> run <container>' in the computer code. It should be noted that in other examples, other container management systems may be used by the computer server, and the command/operation invoked may be different from the above example.

Further, the typical set of operations includes 2. For a cluster of server hosts, a cluster scheduler of the server will determine a server host from among the cluster on which the new container is to be created and application executed therein. For example, in the DOCKER™ example above, the 'docker -H <apiserver> run <container>' command is processed by the cluster API server which leverages the cluster scheduler to determine the actual server to run the container.

Such steps create technical challenges related to latency in a typical container cloud setup. The container scheduling request has to go to the orchestrator (API server), then to the scheduler, which has to determine the host based on the configured scheduling strategy. After that, the container is spawned on the selected host. This entire sequence adversely impacts the latency budget of applications when running in the cloud setup.

The technical solutions described herein address the latency related technical challenges by providing a scheduling so that applications in a serverless architecture can maintain a latency budget.

Further, the technical solutions described herein facilitate identifying cacheable containers to be kept in created and suspended state for further latency improvements. For example, each host in the cluster of servers may maintain a configurable maximum number of cacheable containers, which are kept in suspended state. A least frequently used or least recently used algorithm may be used to maintain the cacheable containers.

The technical solutions described herein provide an improvement to computing technology particularly improve the efficiency of a cloud computing platform that facilitates developers to execute their computer program products using containers in a serverless FaaS paradigm.

In one or more examples, the technical solutions described herein facilitate each server from a cluster of servers to include a second-level container scheduler in addition to a global container scheduler. The second-level container scheduler of a host intercepts calls for spawning another container from one or more containers already executing on that host. The second-level container scheduler attempts to invoke the new container on that host itself, if the host has resources available. If the host does not have resources available, the request for the new container is forwarded to the global scheduler, which in turn identifies a different server from the cluster to host the new container.

Additionally the second-level container scheduler running maintains a usage count of the one or more containers on the host. A spawned container is not killed (cleared) immediately after its completion, rather it may be put in a suspended state so that the container does not consume CPU resources. A new request for the same function, and thus the spawned container increases the container's usage count. The one or more embodiments described further provide additional technical advantages and improvements provided by the technical solutions described herein.

The technical solutions described herein are implemented using cloud computing in one or more examples. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
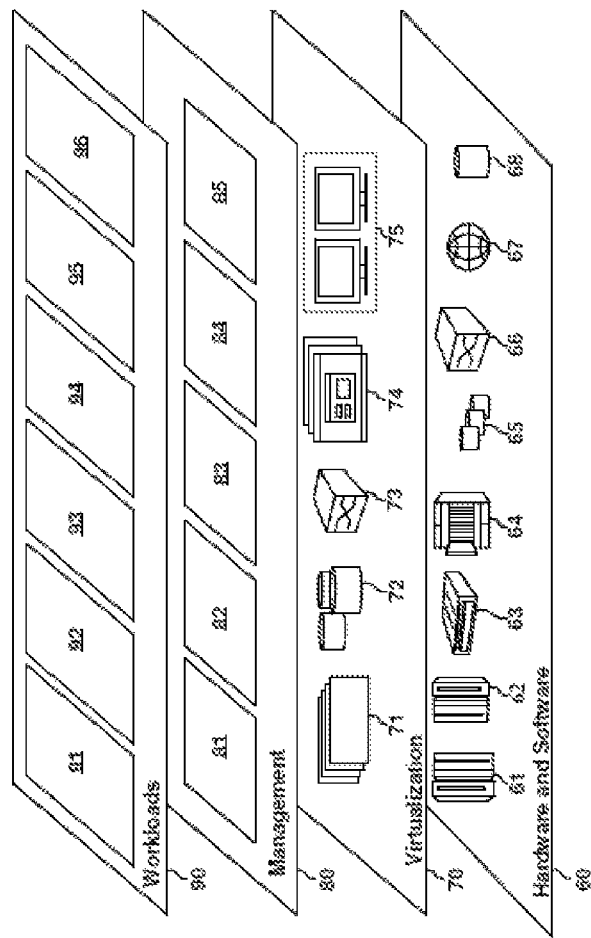
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and document processing 96, among other examples.

Figure 3:
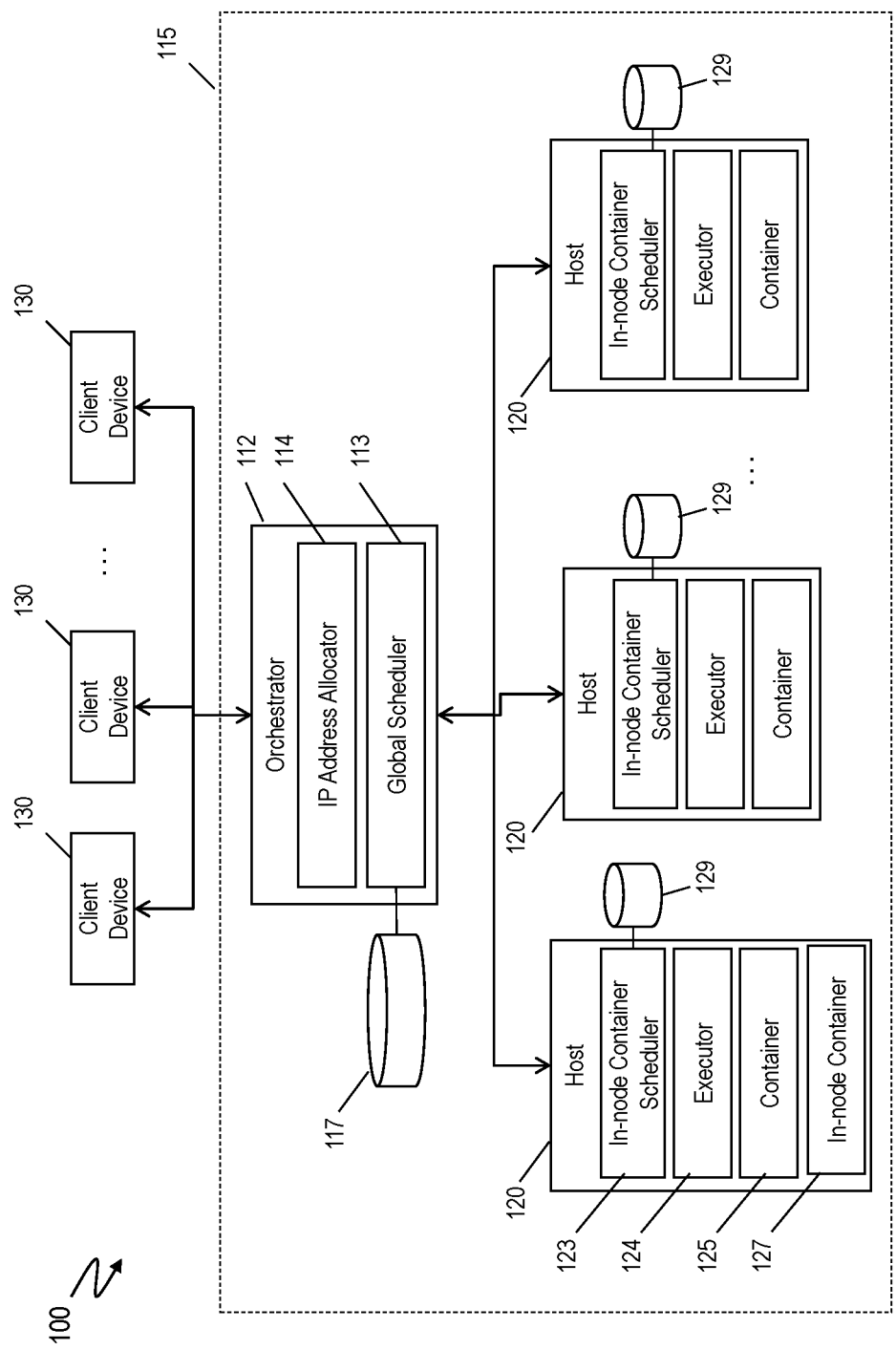
FIG. 3 depicts an example system for assigning containers for executing functions in a software application using a server cluster according to one or more embodiments.

FIG. 3 depicts an example system 100 for container scheduling in a computer cluster server according to one or more embodiments. It should be noted that the illustration is a schematic representation and that the one or more components depicted may be implemented differently in other embodiments, such as by combination or separation. The system 100 includes one or more client devices 130 and a server cluster 115. Users use the client device 130 to upload a software for executing on the server cluster 115. The software includes one or more computer executable instructions along with supporting data, such as images, text files, and the like.

In one or more examples, the software is provided to an orchestrator 112 through an interface for further processing and placing it into the cloud computing environment provided by the server cluster 115. Thus, the software is uploaded by the client device 130 into a computer network where the program can be run and further accessed by client device 130 that uploaded the software, or any other client device 130. In one or more examples, communication between the client devices 130 and the orchestrator 112 may happen over a suitable application programming interface API, for example Representational State Transfer (REST) API or Simple Object Access Protocol (SOAP) API, using data format supported by the API, such as Extensible Markup Language (XML) or JavaScript Object Notation (JSON), or any other.

The orchestrator 112 is a management platform for allocating the software to one or more host(s) 120 and instantiating new hosts 120. A host 120 can be a physical, a virtual, or a partitioned server. Further, the orchestrator 112 builds a container 125 from the built application software when requested, creates an identity to the container 125 and provides the container 125 to the host 120 selected to execute the software. The orchestrator 112 collects status information of the cluster 115, and may update the status information by sending requests to the one or more hosts 120.

In one or more examples, the orchestrator 112 includes an IP address allocator 114 that allocates a unique IP address to each of the hosts 120 that are executing one or more software applications received from the client devices 130. Further, the orchestrator 112 includes a global scheduler 113 that determines which host 120 to use for executing the software. In one or more examples, the scheduler 113 maintains a database 117 that contains data for each of the hosts 120 in the cluster 115. The data includes a list of resources at the hosts 120, such as the one or more components included in the hosts 120 and the availability (and/or the lack thereof) of the resources. For example, the resources of a host 120 may include a list of hardware components and software components that the host 120 provides for executing the one or more software assigned to the host 120.

Accordingly, in response to receiving a software for execution, the global scheduler 113 checks the database 117 to determine the availability of resources at the one or more hosts 120 in the cluster 115. Upon identifying a host 120 that meets the resources sought by the software, the global scheduler 113 assigns the software to be executed by the identified host 120. The developer provides the requirements of resources for the software when uploading the software via the client device 130. The assignment of the selected host 120 to the software includes spawning a new container 125 at the selected host 120 for executing the software. The global scheduler 113 updates the database 117 to indicate that the container 125 on the host 120 is assigned to the software. In one or more examples, in case of FaaS architecture, the corresponding entry in the database 117 further includes an identification of the function being executed in the container 125. For example, the identification of the function may include a unique identifier associated with the function, such as a globally unique identifier (GUID), a universally unique identifier (UUID) or any other identifier, which may include an alphanumeric, numeric, or alphabetic sequence of characters.

In one or more examples, if none of the hosts 120 have resources available for executing the software, the orchestrator 112 instantiates one or more new hosts 120 in the cluster 115. For example, the instantiated hosts 120 may be a virtual server.

The host 120 includes an in-node container scheduler 123, an executor 124. The host 120 may further include one or more containers 125 that have been assigned to the host 120, by the global scheduler 113, for execution. The in-node scheduler 123 and the executor 124 are part of the overall execution runtime of the host 120. In one or more examples, the in-node scheduler 123 and the executor 124 can be different daemons executing on the host 120. Alternatively, in one or more examples, the in-node scheduler 123 and the executor 124 are part of the same daemon.

The executor 124 facilitates executing the one or more containers 125 and the application software within the containers 125. In one or more examples, the executor 124 may be the operating system, hypervisor, or part thereof.

The in-node scheduler 123 intercepts a command for new containers that are issued from within the containers 125. For example, in case of the FaaS architecture, a call to a function that the application has been split into results in a new container being spawned for executing that function. The function may be called in response to detecting the trigger event corresponding to the function as specified by the developer(s). The functions that the software is split into and the corresponding trigger events are identified and specified by the developer(s) when uploading the software to the orchestrator 112. Alternatively, or in addition, the developer(s) may provide/update such information at a later time via one or more API provided by the orchestrator 112.

Subsequently, such a new function call (asking for spawning a FaaS container) by an existing container 125 on the host 120 results in the request being sent to the executor 124 to provision a new in-node container 127 on the same host 120. This request is serviced by leveraging the in-node scheduler 123, which traps the API call for local scheduling of the container 127. The in-node scheduler 123 further communicates with the global scheduler 113 to inform resource utilization status from the host 120 so that the global scheduler 113 can maintain the resource usage state of the hosts 120 in the database 117 for further scheduling of containers 125.

The system 100 thus facilitates scheduling (spawning) in-node containers 127 on the same host 120 that is executing an application within a container 125 that was spawned by the global scheduler 113. Such in-node scheduling facilitates efficient scheduling of the container 127 and reducing the latency for scheduling the container 127 by bypassing the resource and time intensive process of identifying a host 120 for scheduling a new container.

Figure 4:
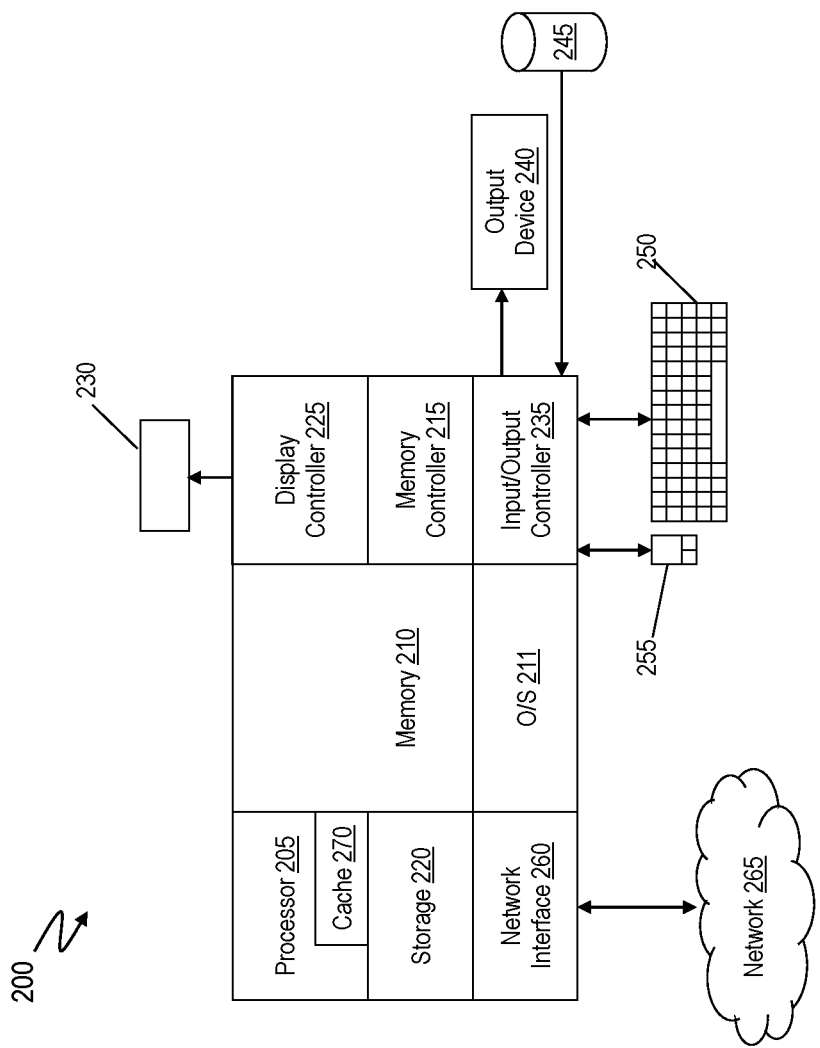
FIG. 4 illustrates an example system according to one or more embodiments.

FIG. 4 illustrates an example system 200 according to one or more embodiments. The system 200 may be a communication apparatus, such as a computer. For example, the system 200 may be a desktop computer, a tablet computer, a laptop computer, a phone, such as a smartphone, a server computer, or any other device that communicates via a network 265. The system 200 includes hardware, such as electronic circuitry. In one or more examples, the system 200 is any one or more of the devices depicted in FIG. 3, such as the client device 130, the host 120, and the cluster 115.

The system 200 includes, among other components, a processor 205, memory 210 coupled to a memory controller 215, and one or more input devices 245 and/or output devices 240, such as peripheral or control devices, which are communicatively coupled via a local I/O controller 235. These devices 240 and 245 may include, for example, battery sensors, position sensors, indicator/identification lights and the like. Input devices such as a conventional keyboard 250 and mouse 255 may be coupled to the I/O controller 235. The I/O controller 235 may be, for example, one or more buses or other wired or wireless connections, as are known in the art. The I/O controller 235 may have additional elements, which are omitted for simplicity, such as controllers, buffers (caches), drivers, repeaters, and receivers, to enable communications.

The I/O devices 240, 245 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 205 is a hardware device for executing hardware instructions or software, particularly those stored in memory 210. The processor 205 may be a custom made or commercially available processor, a central processing unit (CPU), an auxiliary processor among several processors associated with the system 200, a semiconductor based microprocessor (in the form of a microchip or chip set), a macroprocessor, or other device for executing instructions. The processor 205 includes a cache 270, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 270 may be organized as a hierarchy of more cache levels (L1, L2, and so on.).

The memory 210 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 210 may incorporate electronic, magnetic, optical, or other types of storage media. Note that the memory 210 may have a distributed architecture, where various components are situated remote from one another but may be accessed by the processor 205.

The instructions in memory 210 may include one or more separate programs, each of which comprises an ordered listing of executable instructions for implementing logical functions. In the example of FIG. 2, the instructions in the memory 210 include a suitable operating system (OS) 211. The operating system 211 essentially may control the execution of other computer programs and provides scheduling, input-output control, file and data management, memory management, and communication control and related services.

Additional data, including, for example, instructions for the processor 205 or other retrievable information, may be stored in storage 220, which may be a storage device such as a hard disk drive or solid state drive. The stored instructions in memory 210 or in storage 220 may include those enabling the processor to execute one or more aspects of the systems and methods described herein.

The system 200 may further include a display controller 225 coupled to a user interface or display 230. In some embodiments, the display 230 may be an LCD screen. In other embodiments, the display 230 may include a plurality of LED status lights. In some embodiments, the system 200 may further include a network interface 260 for coupling to a network 265. The network 265 may be an IP-based network for communication between the system 200 and an external server, client and the like via a broadband connection. In an embodiment, the network 265 may be a satellite network. The network 265 transmits and receives data between the system 200 and external systems. In some embodiments, the network 265 may be a managed IP network administered by a service provider. The network 265 may be implemented in a wireless fashion, for example, using wireless protocols and technologies, such as WiFi, WiMax, satellite, or any other. The network 265 may also be a packet-switched network such as a local area network, wide area network, metropolitan area network, the Internet, or other similar type of network environment. The network 265 may be a fixed wireless network, a wireless local area network (LAN), a wireless wide area network (WAN) a personal area network (PAN), a virtual private network (VPN), intranet or other suitable network system and may include equipment for receiving and transmitting signals.

Figure 5:
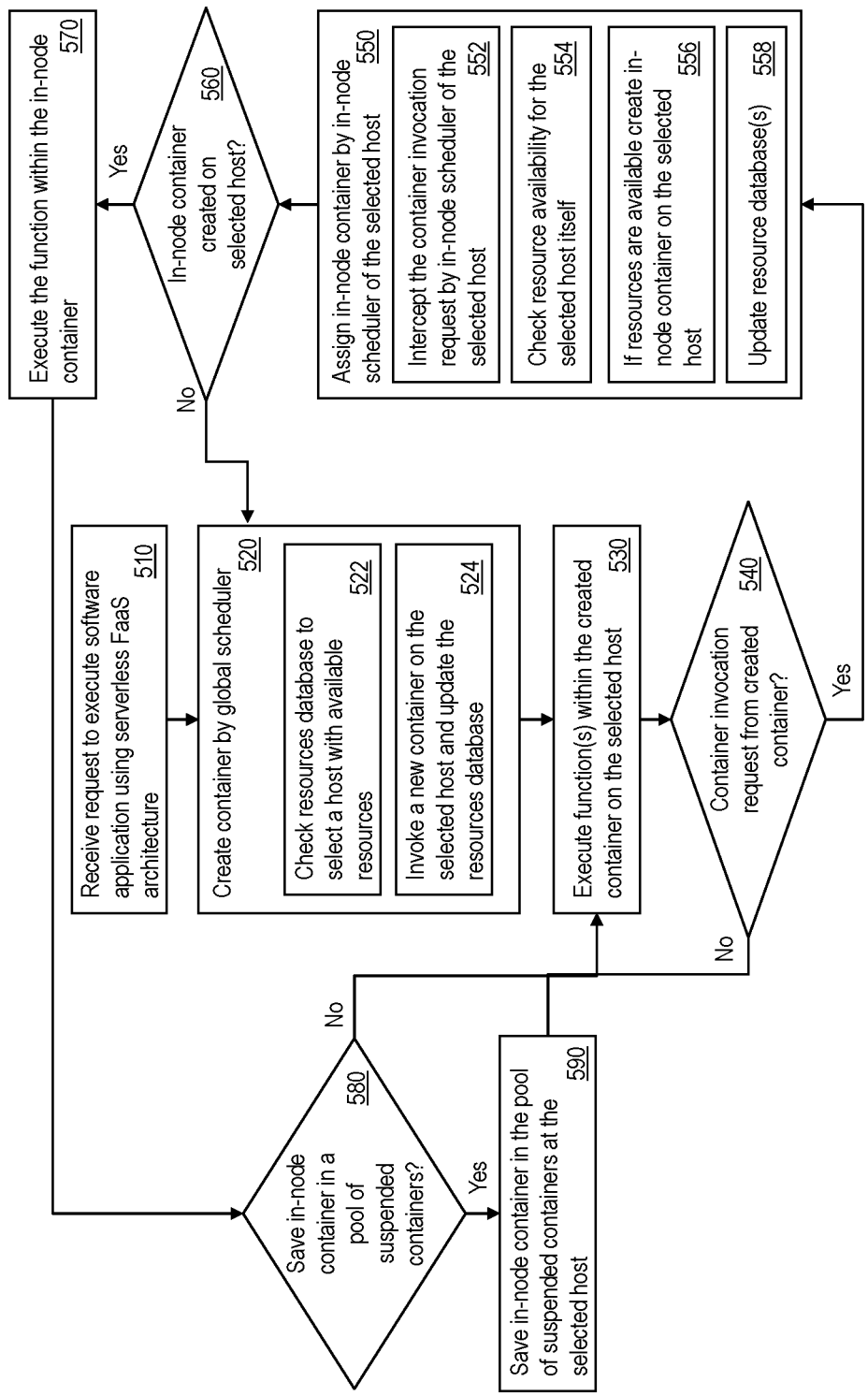
FIG. 5 depicts a flowchart of an example method assigning containers for executing functions in a software application using a server cluster according to one or more embodiments.

FIG. 5 depicts a flowchart of an example method for scheduling a container in a server cluster according to one or more embodiments. The method includes the orchestrator 112 of the server cluster 115 receiving a request to execute a software application, at 510. The request indicates using the serverless FaaS architecture. Accordingly, the received request includes information identifying the events and functions to split the software application for executing using the serverless FaaS architecture. As described, the one or more functions are executed by the server cluster 115 in respective containers in response to corresponding events being triggered.

The global scheduler 113 initiates a first container 125 on a first host 120 for executing the software application, at 520. Creating the first container 125 on the first host 120 includes checking the resources database 117 to select the first host based on the availability of resources that the software application uses, at 522. The request to execute the software application indicates the resources required, in one or more examples. If a host with required resources is not available, the orchestrator 112 initiates the first host 120 as a new host for the software application. Once the first host 120 is selected, the first container 125 is initiated on the first host 120 and assigned for executing the software application. For example, in case of the DOCKER™ management system, the invocation of the software application on the first host 120 results in calling a command of format 'docker -H <apiserver> run <container>'.

The first container 125 separates the execution instance of the software application from other applications and functions being executed by the first host 120 (and other hosts 120 in the server cluster 115). Further, the global scheduler 113 updates the resources database 117 with an entry that records that the first container 125 is now assigned to the first host 120 and has been assigned the resources as requested at the software application invocation, at 524.

The software application continues to execute within the first container 125, at 530. The in-node scheduler 123 on the first host monitors for container invocation requests from the first container 125, at 540. The invocation for a new container may be in response to one of the trigger events corresponding to a function from the software application that is to be executed according to the serverless FaaS architecture. In absence of such an invocation request, the execution of the software application in the first container 125 continues.

For example, in case of the DOCKER™ management system, the invocation of a first function in response to a corresponding event trigger results in calling a command of format 'docker -H <apiserver> run <in-node-container>'. The commands, and/or the formats in other examples may be different from the one or more examples described herein. The container invocation request is directed to be received by the global scheduler 113 that manages the container scheduling. In response to such a container invocation request, the in-node scheduler 123 intercepts the request and attempts to schedule an in-node container 127 corresponding to the request, at 550.

Assigning the in-node container by the in-node scheduler 123 of the first host 120 includes intercepting the container invocation request from the first container 125 that is executing on the first host 120, at 552.

Figure 6:
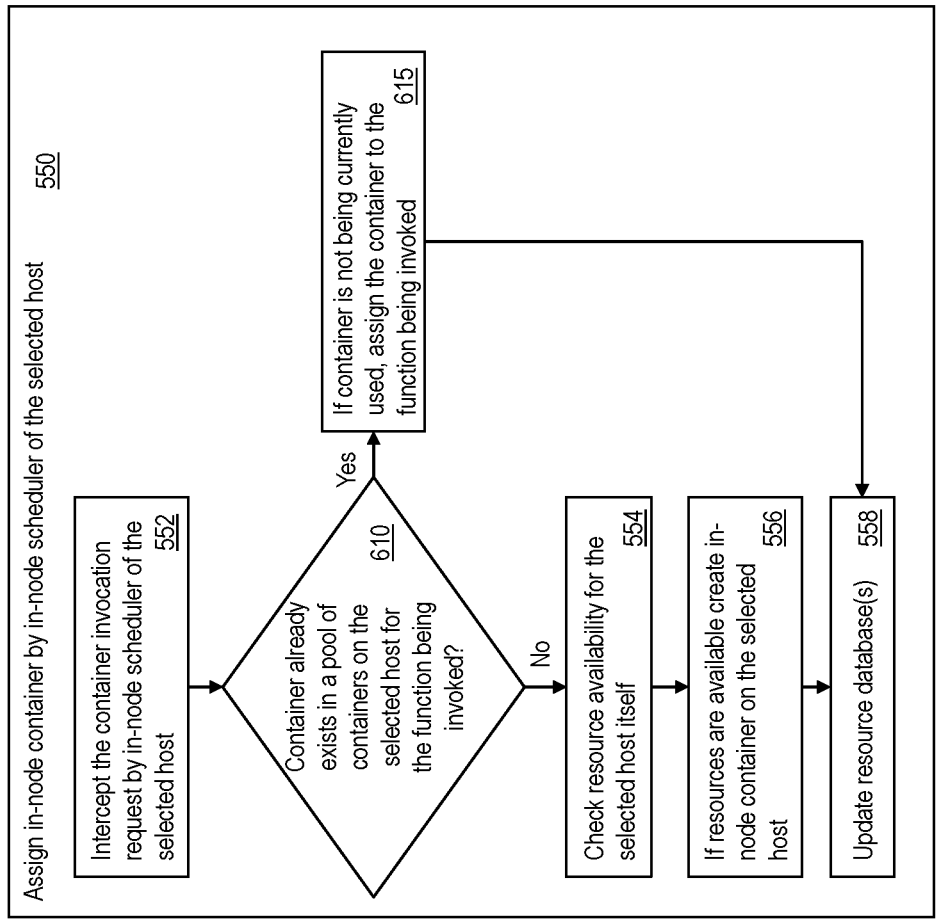
FIG. 6 depicts a flowchart of an example method assigning containers for executing functions in a software application using a server cluster according to one or more embodiments.

FIG. 6 depicts an example method for the in-node scheduler 123 to assign the in-node container 127 to the first function being invoked according to one or more embodiments. In one or more examples, the first host 120 maintains a pool or list of containers associated with specific functions in a suspended state. The in-node scheduler 123 determines which container to add to the pool of suspended containers based on one or more metrics that the in-node scheduler 123 monitors (described further; see 580). The in-node scheduler 123 checks if the first function being invoked by the first container 125 already has an in-node container 127 that is in the list, at 610. If the in-node container 127 already exists, and if the in-node container is free (that is not being used by another instance of the first function), the in-node scheduler 123 assigns the in-node container 127 to the first function invoked from the first container 125, at 615.

Further, the method includes the in-node scheduler 123 updating the resource database 117 to indicate that the first host 120 now executes the in-node container 127 using the resources as required by the first function, at 558. The in-node scheduler 123 updates the resource database 117 using an authorization provided by the global scheduler 113. For example, the global scheduler 113 provides the authorization to the in-node scheduler 123 when the first host 120 is initiated. Alternatively, or in addition, the global scheduler 113 provides the authorization to the in-node scheduler 123 in response to a request from the in-node scheduler 123.

Alternatively, if the in-node container 127 does not already exist, or if (referring back to the flowchart in FIG. 5) in case the pool of suspended containers is not maintained, the assignment of the in-node container 127 to the first function further includes, the in-node scheduler 123 checking resource availability for the first function that is to be executed in the new container, at 554. The in-node scheduler 123 only checks resource availability at the first host 120. In one or more examples, the in-node scheduler 123 checks the resource availability using a second resources database 129, which is specific to the resource at the first host 120. Alternatively, the in-node scheduler 123 uses the resources database 117. In one or more examples, the global scheduler 113 provides authorization to the in-node scheduler 123 to access the resources database 117.

If resources are available at the first host 120, the in-node scheduler 123 creates an in-node container 127 on the first host 120, at 556. The in-node container 127 separates the execution of the first function from other applications and functions being executed by the first host 120. Further, the method includes the in-node scheduler 123 updating the resource database 117 to indicate that the first host 120 now executes the in-node container 127 using the resources as required by the first function, at 558. The in-node scheduler 123 updates the resource database 117 using an authorization provided by the global scheduler 113. For example, the global scheduler 113 provides the authorization to the in-node scheduler 123 when the first host 120 is initiated. Alternatively, or in addition, the global scheduler 113 provides the authorization to the in-node scheduler 123 in response to a request from the in-node scheduler 123.

Alternatively, or in addition, the in-node scheduler 123 updates the second resource database 129 that is specific to the first host 120.

If the in-node container 127 is created on the first host 120 that is executing the first container 125, the first function invoked from within the first container 125 is executed within the in-node container 127, at 560 and 570. If the in-node container 127 is not created by the in-node scheduler 123, because of lack of available resources at the first host 120, the invocation request from the first container 125 is forwarded to the global scheduler 113, which creates a second container 125 at a second host 120, at 520. As described earlier, the global scheduler 113 identifies the second host 120 from the server cluster 115 based on the available resources using the resource database 117 and invokes the second container 125 at the second host 120 subsequently, at 522 and 524. The resource database 117 is updated accordingly.

After execution of the first function in the in-node container 127 is completed (570), the in-node scheduler determines whether to save the in-node container in a suspended state in the pool of suspended containers, at 580. The suspended state is an inactive state, where the container 127 is mapped to the one or more resources, such as libraries, binaries, runtime objects, memory space, communication ports, and the like, however, the container is not associated with an instance of a function execution. In one or more examples, the resource database 129, and/or the resource database 117 includes the list of containers in a suspended state. Alternatively, or in addition, each in-node scheduler 123 maintains the list of suspended state in-node containers for each respective host 120.

The in-node scheduler 123 determines whether to save the in-node container 127 for the first function in suspended state based on one or more metrics that the in-node scheduler 123 or a runtime of the first host 120 monitors. For example, the metrics monitored include a number of times the first function is invoked, a frequency of invocation of the first function, a time required to create a setup the in-node container 127, and the like. For example, if the first function is invoked using the in-node container 127 at least a predetermined number of times, the in-node container 127 is stored in the pool of suspended containers. Alternatively, or in addition, if the frequency of the first function being invoked using the in-node container 127 is at least a predetermined value for a predetermined duration, the in-node container 127 is stored in the pool of suspended containers. For example, the predetermined duration may be 30 minutes, 60 minutes, 2 days or any other duration. Alternatively, or in addition, if the time to create and setup the in-node container 127 is above a predetermined threshold, 5 milliseconds, 1 second, or any other predetermined value, the in-node container 127 is stored in the pool of suspended containers. It should be noted that in other embodiments, threshold values other than the examples listed above may be used. Further, metrics other than those listed above may be used in other embodiments.

If the in-node scheduler 123 determines to store the in-node container 127 in the suspended state based on the one or more statistics, the in-node container 127 is accordingly saved and the pool is updated. In one or more examples, the pool of suspended containers is of a predetermined size, for example, a predetermined number of containers are stored in suspended state. Hence, when an in-node container 127 is being added to the pool, if the pool is already full, an existing entry in the pool of suspended containers is removed, letting that container to be deleted, and the in-node container 127 is added in its place in the pool. The container removed may be determined using an algorithm such as a least recently used, least frequently used, or the like. Thus, assigning an in-node container from the pool of suspended containers further reduces the latency of scheduling a container for a function invocation in a serverless FaaS architecture, using the technical solutions described herein.

The method reduces the latency in assigning of the containers to function invocations in a server cluster, particularly when using a serverless FaaS architecture because the in-node scheduler 123 can check availability at the first host 120 and create the in-node container 127 taking lesser time than the global scheduler 113 checking resource availability across all the hosts in the server cluster 115. The latency is further reduced by maintaining a pool of in-node containers in a suspended state at each host in the server cluster and assigning a container from the pool.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the technical features herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for assigning containers for executing functions in a software application using a server cluster, the method comprising:
   creating, by a global processor of the server cluster, a first container at a first host node in the server cluster, the first container assigned for executing a first function from the software application;
   intercepting, by an in-node processor of the first host node, a command from the first function for creating a second container for executing a second function;
   assigning, by the in-node processor, an in-node container as the second container, the in-node container being a container executing on the first host node, wherein assigning the in-node container as the second container further comprises:
   identifying, by the in-node processor, that the in-node container exists in suspended state, and in response, assigning the in-node container to the execution of the second function, the suspended state is an inactive state, wherein the in-node container is mapped to one or more resources of the first host node without the in-node container being associated with any instance of a function execution, wherein assigning the in-node container as the second container comprises:
   determining, by the in-node processor, that resources available at the first host node meet resources to be used by the second function, and in response, creating the in-node container at the first host node; and
   in response to the resources available at the first host node not meeting the resources to be used, the in-node processor forwards the command from the first function for creating the second container to the global processor; and
   updating, by the in-node processor, a resource database that indicates that the second function is being executed in the in-node container on the first host node.

2. The computer-implemented method of claim 1, wherein the global processor selects the first host node for creating the first container based on resources available at the first host node satisfying resources to be used by the first function.

3. The computer-implemented method of claim 1, wherein the command from the first function for creating the second container is directed for receipt by the global processor.

4. The computer-implemented method of claim 1, wherein, in response to the in-node container not being present in the suspended state, determining, by the in-node processor, that resources available at the first host node meet resources to be used by the second function, and in response, creating the in-node container at the first host node.

5. The computer-implemented method of claim 1, wherein the first function invokes creation of the second container in response to an event triggering execution of the second function.

6. The computer-implemented method of claim 1, further comprising:
   after execution of the second function is complete, determining, by the in-node processor, to store the in-node container in a suspended state based on a metric associated with the second function.

7. A system comprising:
   a server cluster comprising a plurality of host nodes;
   a global processor of the server cluster, the global processor comprising one or more processing units coupled with a memory device, the global processor configured to assign containers for executing functions in a software application using the server cluster using functions as a service architecture, wherein the global processor is configured to create a first container at a first host node in the server cluster, the first container assigned for executing a first function from the software application; and
   an in-node processor executing on the first host node that comprises one or more processing units, the in-node processor configured to:
   intercept a command from the first function for creating a second container for executing a second function;
   assign an in-node container as the second container, the in-node container being a container executing on the first host node, wherein assigning the in-node container as the second container further comprises:
   identifying, by the in-node processor, that the in-node container exists in suspended state, and in response, assigning the in-node container to the execution of the second function, the suspended state is an inactive state, wherein the in-node container is mapped to one or more resources of the first host node without the in-node container being associated with an instance of a function execution, wherein assigning the in-node container as the second container comprises:
    determining, by the in-node processor, that resources available at the first host node meet resources to be used by the second function, and in response, creating the in-node container at the first host node; and
    in response to the resources available at the first host node not meeting the resources to be used, the in-node processor forwards the command from the first function for creating the second container to the global processor; and
update a resource database that indicates that the second function is being executed in the in-node container on the first host node.

8. The system of claim 7, wherein the command from the first function for creating the second container is directed for receipt by the global processor.

9. The system of claim 7, wherein, in response to the in-node container not being present in the suspended state, determining, by the in-node processor, that resources available at the first host node meet resources to be used by the second function, and in response, creating the in-node container at the first host node.

10. The system of claim 7, wherein further after execution of the second function is complete, the in-node processor determines storing the in-node container in a suspended state at the first host node based on a metric associated with the execution of the second function.

11. A computer program product comprising a computer readable storage medium having program instructions embodied therewith, the program instructions executable by one or more processing circuits to cause one or more processing circuits to assign containers for executing functions in a software application using a server cluster using functions as a service architecture, the assigning comprises:
    creating, by a global processor of the server cluster, a first container at a first host node in the server cluster, the first container assigned for executing a first function from the software application;
    intercepting, by an in-node processor of the first host node, a command from the first function for creating a second container for executing a second function;
    assigning, by the in-node processor, an in-node container as the second container, the in-node container being a container executing on the first host node, wherein assigning the in-node container as the second container further comprises:
        identifying, by the in-node processor, that the in-node container exists in suspended state, and in response, assigning the in-node container to the execution of the second function, the suspended state is an inactive state, wherein the in-node container is mapped to one or more resources of the first host node without the in-node container being associated with an instance of a function execution, wherein assigning the in-node container as the second container comprises:
            determining, by the in-node processor, that resources available at the first host node meet resources to be used by the second function, and in response, creating the in-node container at the first host node; and
            in response to the resources available at the first host node not meeting the resources to be used, the in-node processor forwards the command from the first function for creating the second container to the global processor; and
    updating, by the in-node processor, a resource database that indicates that the second function is being executed in the in-node container on the first host node.

12. The computer program product of claim 11, wherein the command from the first function for creating the second container is directed for receipt by the global processor.

13. The computer program product of claim 11, wherein assigning the in-node container as the second container further comprises:
    in response to the in-node container not being present in the suspended state, determining, by the in-node processor, that resources available at the first host node meet resources to be used by the second function, and in response, creating the in-node container at the first host node; and
    in response to the resources available at the first host node not meeting the resources to be used, the in-node processor forwards the command from the first function for creating the second container to the global processor.

14. The computer program product of claim 11, wherein further after execution of the second function is complete, the in-node processor determines storing the in-node container in a suspended state at the first host node based on a metric associated with the execution of the second function.

* * * * *